April 28, 1936.   W. H. H. FROST   2,038,930
DIGGING APPARATUS
Filed March 30, 1935    5 Sheets-Sheet 5
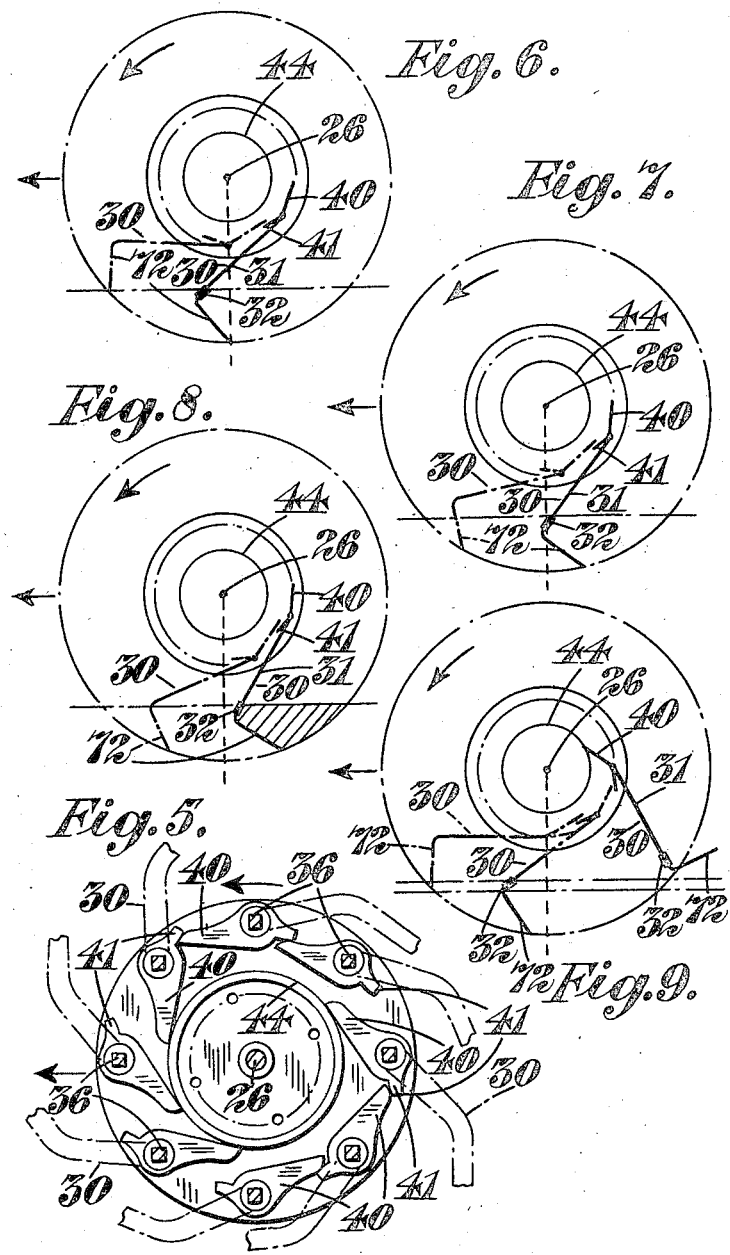
INVENTOR
William Henry Hony Frost
by his att'ys
Byrnes Stebbins Blenko Patented Apr. 28, 1936

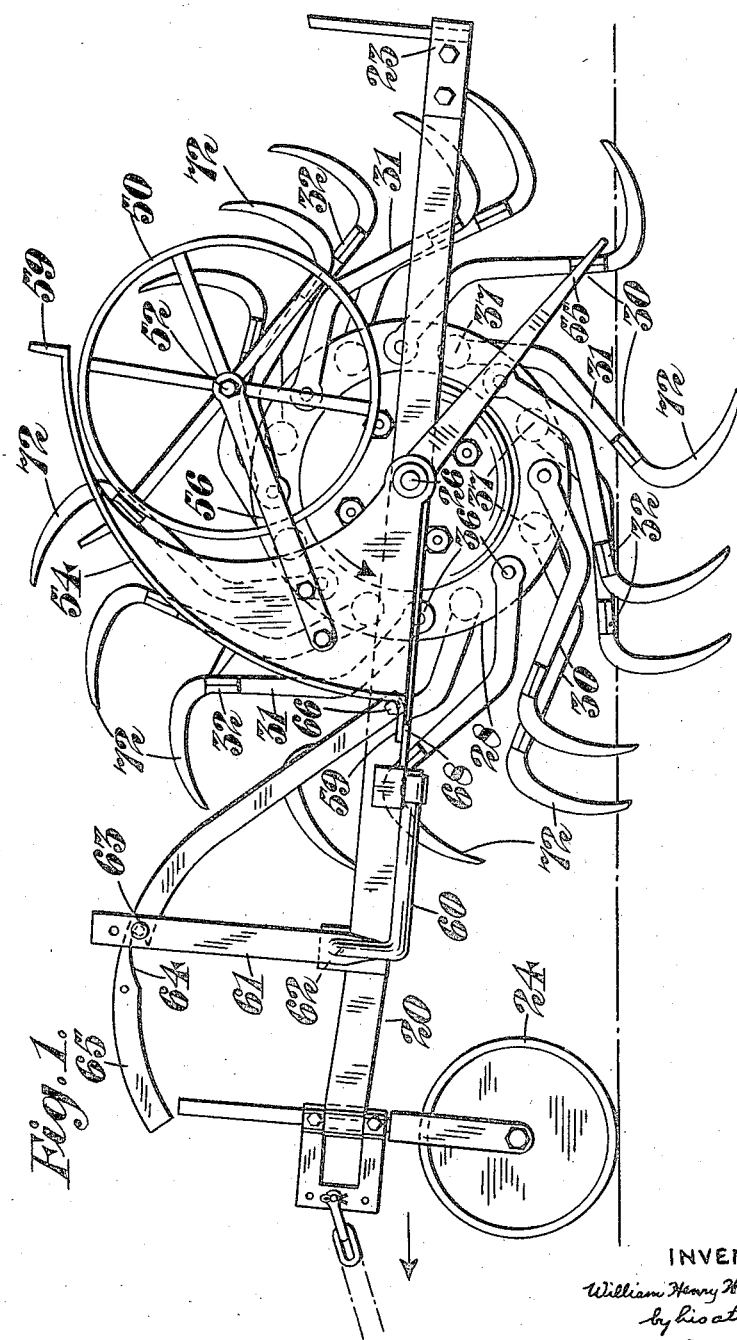

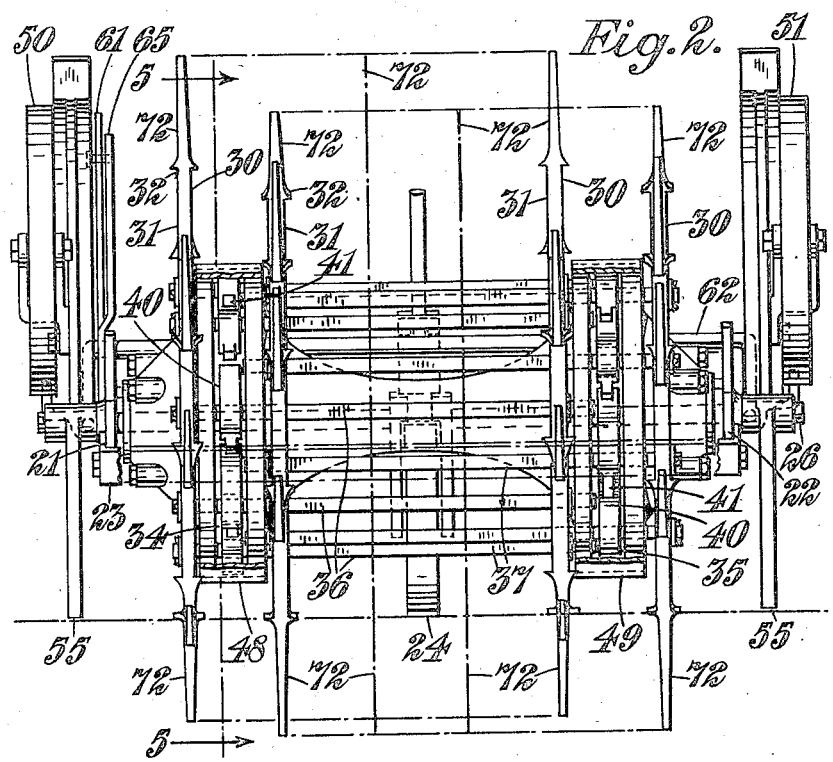

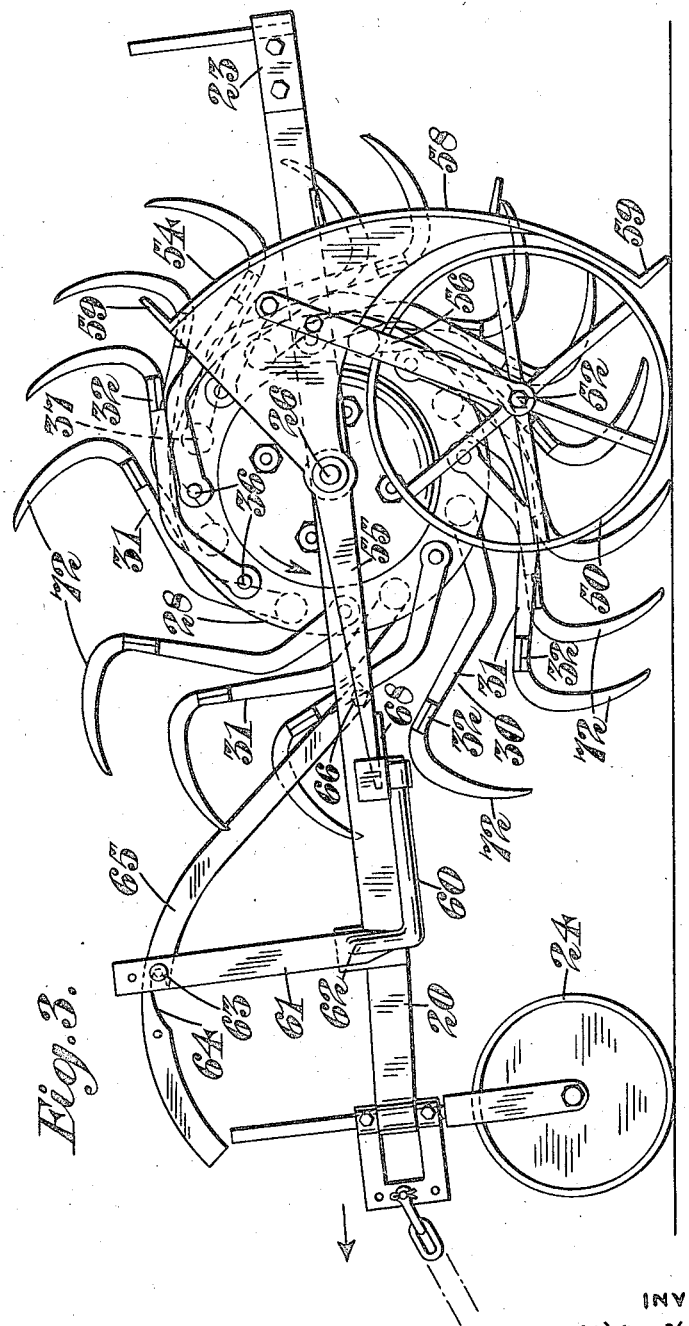

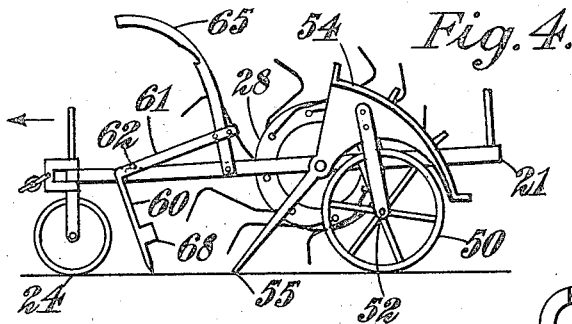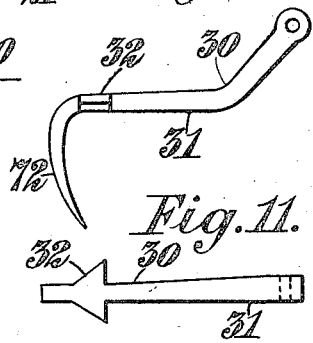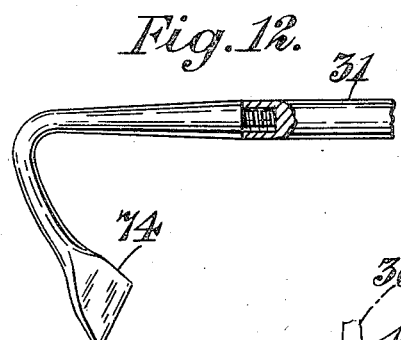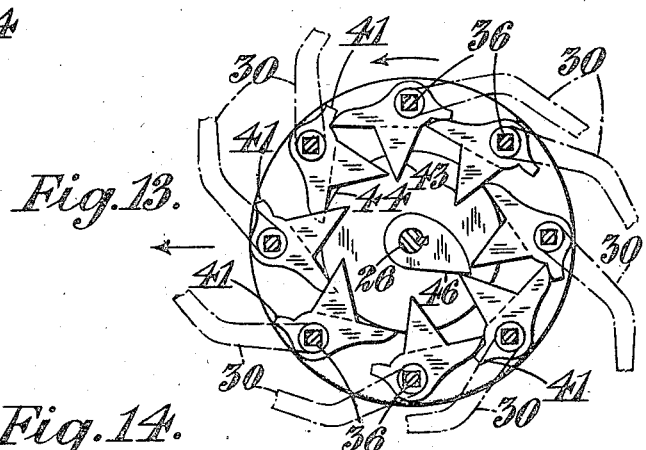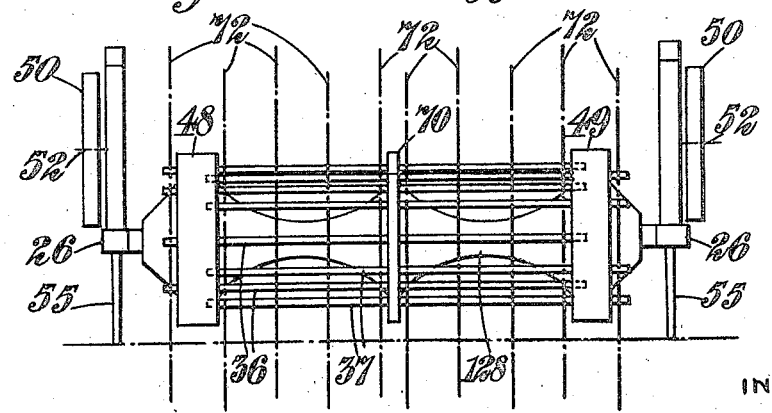

2,038,930

UNITED STATES PATENT OFFICE 2,038,930

DIGGING APPARATUS

William Henry Hony Frost, Hinxworth, near Baldock, England

Application March 30, 1935, Serial No. 13,892
In Great Britain April 11, 1934

13 Claims. (Cl. 55—11)

This invention relates to digging apparatus of the type comprising digging tools carried by a rotary member, e. g. a disc, cylinder, wheel or the like, for digging up the ground, when the apparatus is caused to travel over the ground.

The invention has for one of its objects to provide an improved construction of apparatus of the type described, wherein its weight and the tractive effort applied to it is used more effectively than heretofore for causing the ground to be loosened or dug by the tools.

According to the invention there is provided a digging device comprising a rotor to be traversed over the ground, a plurality of digging implements, each having a shank with a digging tool at one end, pivotally mounted one behind another on the rotor so that each tool can rock towards and away from the axis of rotation of the rotor, and connecting means for operatively connecting each implement with another implement so that each implement in turn, on the tool carried thereby entering the ground, will rock and cause the other implement connected thereto to rock about its pivot in the direction to remove the tool thereon from the ground.

Preferably, the pivot of each implement is situated, in relation to the tool carried by it, at the front considered with respect to the direction of rotation of the device.

Conveniently, the said connecting means operatively connects each implement to the next adjacent implement on both sides thereof.

According to a feature of the invention, each implement in turn leaves the ground relatively rapidly with respect to the rate at which each implement is forced into the ground.

The said connecting means may comprise a plurality of rockers each coaxially rotatable with one of the implements, and each arranged to impart rotary movement to an adjacent rocker.

According to another feature of the invention, two sets of digging implements are arranged spaced apart in the direction of length of the axis of rotation of the rotor, and the pivotal axes of the implements of one set are arranged alternately with those of the other set.

According to yet another feature of the invention, a digging device as described above is carried by a frame having a pair of road wheels, and lifting means, on which said wheels are journalled, one at each side of the frame, is pivoted on the frame and arranged to be swung into two end positions, in one of which the wheels run on the ground and lift the digging device therefrom, and in the other of which the wheels are lifted from the ground and the digging device rests on the ground and supports the frame.

Other features of the invention relating to means for limiting the swinging movement of the tools away from the rotor, and to preferred constructions of the said lifting means and the digging implements will be described hereinafter.

One embodiment of the invention and modifications thereof are diagrammatically illustrated by way of example in the accompanying drawings, wherein:—

Figure 1 is a side elevation showing one form of digging machine according to the invention comprising a digging device shown in its operative position, and Figure 2 is a rear elevation thereof, partly broken away;

Figure 3 is a side elevation of the machine with all the road wheels on the ground and the digging device lifted therefrom into its inoperative position, and Figure 4 is a diagrammatic side elevation of the machine on a smaller scale showing lifting means for the rear road wheels in a position to remove the latter from the ground as the machine moves forwards;

Figure 5 is a section through one end of the rotor taken on the line 5—5 in Figure 2 showing means for rocking the digging implements, and Figures 6, 7, 8, and 9 are diagrams illustrating the movement of a digging implement;

Figures 10 and 11 are respectively side elevation and plan showing one form of digging implement, and Figure 12 is a side elevation showing part of a modified form;

Figure 13 is a diagrammatic end view of a rotor having modified means for rocking the digging implements, and Figure 14 is a diagrammatic rear elevation showing part of a digging machine comprising a modified form of rotor.

Like reference characters designate like parts throughout the several views.

Referring first to Figures 1 to 5, the main frame 20 of the digging machine comprises two longitudinals 21, 22 which may be connected together at the rear by an end member 23, shown broken away in Figure 2, the front end of the frame being supported by a front wheel 24 in any convenient manner. A main shaft 26 is fixedly carried by the longitudinals and carries a digging device comprising a rotor 28 which is traversed over the ground when the machine is propelled forwards in the direction of the straight arrows shown in Figures 1 and 3. A plurality of digging implements 30, each having a shank 31, with a digging tool 32 at one end, as shown in Figures 10 and 11, are pivotally mounted one behind another on the rotor 28, so that each tool 32 can rock towards and away from the axis of rotation of the rotor. The rotor is of dumb-bell shape and has at its ends two annular chambers or grooves 34, 35. Two sets of rods 36, 37 are arranged alternately extending through one groove to the inner wall of the other groove. Each of these rods is rotatable and has fast on it, in one of the grooves, a pivoted member in the form of a two-armed rocker or lever 40, 41, whereof the arm 40 is longer than the arm 41. Each rod 36, 37 also has fast on it three digging implements 30, those on the two sets of rods being staggered in relation to one another, so that six circular sets of digging implements are provided spaced apart across the machine, one set lying outside each end of the rotor, and the other sets between the ends. The pivot of each implement is situated, in relation to the tool carried by it, at the front considered with respect to the direction of rotation of the digging device shown by the curved arrows. The levers 40, 41 constitute connecting means for operatively connecting each implement in one set with another implement in the same set. Each implement is operatively connected by a lever to the next adjacent implement on both sides thereof, as one longer arm of each of said levers is arranged to bear on and rock a shorter arm of an adjacent lever.

In order to limit the outward swinging movement of the tools away from the rotor, limiting means in the form of an annular abutment 44 is provided in each annular groove 34, 35 forming the bottom of the groove with which the rockers or levers 40, 41 can coact.

These levers 40, 41 are so designed and the spacing apart of the rods 36, 37 is such that each implement in turn will rock, when its tool enters the ground, and cause the next implement already in the ground to rock about its pivot in the direction to remove its tool from the ground, the pivot of each implement in the ground being situated in relation to the tool carried by it at the rear with respect to the direction of travel of the device.

Referring to Figures 6 to 9, during the travel of the digging device, the leading implement 30, shown in full lines, has moved from the position it previously occupied, shown in broken lines, when it was about to enter the ground, and a following implement 30, shown in broken lines, now occupies the latter position with its tool 32 bearing on the surface of the ground. Almost the entire weight of the digging device and the frame 20 supported thereby, bears on these two implements, and owing to the interconnection of the same by the rockers 40, 41, the following implement tends to rock the leading implement in a direction to move its tool through the soil in which it has been inserted and loosen the same. The preferably pointed end of a following tool 32 is forced gradually into the ground until the tool 32 takes the weight suddenly and imparts a jerk to the leading implement. Finally, as will be understood from Figures 8 and 9, the leading implement shown in full lines is caused rapidly to lift the ground, and throws up soil in so doing, its upward movement being arrested when the longer arm 40 of its rocker bears against the abutment 44. During the travel of the digging device, the rotor is continually rolling over the digging implements in succession, and its weight acting on them is used for entering each digging implement in turn into and rapidly removing it from the ground in a manner simulating that which occurs when digging the ground manually with a spade.

In some cases, for example if the ground is very heavy, it may be desirable to assist the rapid removal of the implements from the ground by additional means. As shown in Figure 13, the rockers 40, 41 are provided with a third arm 43 arranged to coact with a stop 46 fixed on the fixed shaft 26. When the rotor 28 rotates, each rocker 40, 41, 42 can contact once each revolution with the stop 46 for positively moving the tools away from the rotor into an outer position after they have left the ground.

The annular chambers 34 and 35 containing the rockers are preferably enclosed by an annular cover 48, 49 respectively, for keeping them free from dirt.

The main frame 20 of the machine is provided with a pair of road wheels 50, 51 whereof the axis of rotation 52 is preferably situated in the running position, as shown in Figure 3, just to the rear of the vertical plane containing the axis of rotation 26 of the rotor 28. As it is desirable to remove the digging device to a situation out of contact with the ground when travelling over roads and the like, lifting means is provided on which the road wheels 50, 51 are journalled, one at each side of the frame 20. This lifting means comprises two two-armed lifting members 54, 55, one at each side of the frame 20. As these lifting members are alike, a description of one will suffice for both. The arm 55 is straight and constitutes a strut, and can be held in its horizontal position by manually-controlled means described hereinafter. The arm 54 is of curved formation, somewhat like a horn, and its associated road wheel 50 is supported on it by a rod 56, which may be bolted to or integral with the arm 54. The outer end of the arm 54 provides a curved tread surface 58 which may carry spuds 59, which surface lies in a vertical plane, and is arranged to roll on the ground when the road wheel 50 is being returned from an elevated inoperative position to its operative running position.

The control means for the lifting member 54, 55 comprises an angle lever 60, 61, that is pivoted on the frame 20 at 62. The arm 61 of this lever carries at its free end a pin 63 which can be received in a notch 64 in a manually-controlled member 65 that is pivoted at 66 on the frame 20 at the rear of the pivot 62. The arm 60 of the lever 60, 61 carries at its free end a U-shaped seat 68 for receiving the end of the strut 55. When this strut is released from its seat 68 by releasing the pin 63 from the notch 64, the lifting member 54, 55 will move into its position shown in Figure 4, in which the strut 55 bears on the ground. When the machine travels forward, the frame 20 will be lifted bodily and swung about the lower end of the strut 55 as a pivot, until the lifting member 54, 55 occupies the position shown in Figure 1, when an end spud 59 can bear on the seat 68 on the lever arm 60. The lifting member 54, 55 can remain in this position because the arm 54 forms a counterpoise for the road wheel 50 which is thereby held in an inoperative position above the ground. To return the road wheel to the ground, it is only necessary to release the angle lever 60, 61 by rocking the control member 65 about its pivot, when the arm 54 will descend and roll on the ground until the strut 55 is arrested by and supported on the angle lever 60, 61 in the position shown in Figure 3.

As shown in Figure 14, the rods 36, 37, which constitute axles for the digging implements, may be supported in bearings at the middle of their length by a central annular portion 70 of a rotor 128 of modified construction. In this digging device there may be five circular rows of digging implements in each set or group, i. e. ten rows in all, as indicated by the broken lines. In some cases more than two sets of rods that carry digging implements may be provided.

Various constructions of digging implements may be employed. As shown in Figure 10, the implement 30 is provided with a tine 72 which is forced into the ground before the tool 32 itself contacts with the surface thereof. In some cases, the blade-shaped portion 32 may be omitted. Alternatively, as shown in Figure 12, a blade 74, shaped like a spud or spade, may be provided, e. g. detachably, at the end of the implement 30.

The described digging machine is very effective and efficient, and it is found that a relatively small tractive effort is required to propel it along the ground which is thoroughly loosened and dug by the digging device.

I claim:—

1. A digging device comprising in combination, a rotor, a plurality of digging implements each having a shank with a digging tool at one end, which implements are pivotally mounted one behind another in a circular row on the rotor so that each tool can rock towards and away from the axis of rotation of the rotor, a plurality of rockers each fixedly connected with and co-axially rotatable with one of the implements, and each arranged to impart rotary movement to an adjacent rocker so that each implement in turn, on the tool carried thereby entering the ground, will rock and cause another implement connected thereto to rock about its pivot in the direction to remove its tool from the ground, and an annular abutment with which the rockers can coact, and limit the outward swinging movement of the implements away from the rotor.

2. A digging device, comprising in combination, a rotor, two sets of digging implements, each having a shank with a digging tool at one end, and each pivotally mounted on the rotor so that each tool can rock towards and away from the axis of rotation of the rotor, which sets of digging implements are arranged spaced apart in the direction of length of the axis of rotation of the rotor, and the pivotal axes of the implements of one set are arranged alternately with those of the other set, and connecting means is arranged to connect each implement of one set with another implement of the same set so that each implement in turn, on the tool carried thereby entering the ground, will rock and cause the other implement connected thereto to rock about its pivot in the direction to remove its tool from the ground.

3. A digging device according to claim 2, characterized in that the pivotal axis of each digging implement is provided by a rod that carries a plurality of implements.

4. A digging device, comprising in combination, a fixed shaft, a rotor rotatable thereon, a plurality of digging implements, each having a shank with a digging tool at one end, pivotally mounted one behind another in a circular row on the rotor so that each tool can rock towards and away from the axis of rotation of the rotor, a plurality of rockers each fixedly connected with and coaxially rotatable with one of the implements, and each arranged to impart rotary movement to an adjacent rocker so that each implement in turn, on the tool carried thereby entering the ground, will rock and cause the other implement connected thereto to rock about its pivot in the direction to remove its tool from the ground, a stop fixed on said shaft, which rockers are three-armed levers, whereof one arm is arranged to coact with said stop each revolution of the rotor for positively moving the tools away from the rotor into an outer position after they have left the ground.

5. A digging device, comprising in combination a rotor to be traversed over the ground, a plurality of digging implements, each having a shank with a digging tool at one end, pivotally mounted one behind another on the rotor so that each tool can rock towards and away from the axis of rotation of the motor, and connecting means arranged to connect each implement with another implement so that each implement in turn, on the tool carried thereby entering the ground, will rock and cause the other implement connected thereto to rock about its pivot in the direction to remove its tool from the ground, characterized in that the pivoted axis of each digging implement is provided by a rod that carries a plurality of implements.

6. A digging device, comprising in combination a rotor, two sets of digging implements, each having a shank with a digging tool at one end, and each pivotally mounted on the rotor so that each tool can rock towards and away from the axis of rotation of the rotor, which sets of digging implements are arranged spaced apart in the direction of length of the axis of rotation of the rotor, and the pivotal axes of the implements of one set are arranged alternately with those of the other set, and connecting means arranged to connect each implement of one set with another implement of the same set so that each implement in turn, on the tool carried thereby entering the ground, will rock and cause the other implement connected thereto to rock about its pivot in the direction to remove its tool from the ground, characterized in that the pivotal axis of each digging implement is provided by a rod that carries a plurality of implements.

7. A digging device, comprising in combination a rotor, a plurality of digging implements each having a shank with a digging tool at one end, which implements are pivotally mounted one behind another in a circular row on the rotor so that each tool can rock towards and away from the axis of rotation of the rotor, and connecting means comprising a plurality of rockers each coaxially rotatable with one of the implements and each arranged to impart rotary movement to an adjacent rocker so that each implement in turn, on the tool carried thereby entering the ground, will rock and cause the other implement connected thereto to rock about its pivot in the direction to remove the tool thereon from the ground, which rotor is rotatable about a fixed shaft, and said shaft fixedly carries a stop with which each rocker can contact once each revolution of the rotor for positively moving the tools away from the rotor into an outer position after they have left the ground.

8. A digging device comprising in combination a rotor to be traversed over the ground, a plurality of rockers pivotally mounted thereon in a concentric row one behind another so as to rock towards and away from the axis of rotation of the rotor, limiting means for restricting the movement of the rockers towards said axis, and a plurality of digging tools whereof at least one is operatively connected with each of said rockers so as to be rocked thereby, which rockers are arranged so that each can bear on and rock an adjacent rocker in a direction to remove a tool allotted thereto from the ground.

9. A digging device comprising in combination a rotor to be traversed over the ground, a plurality of two-armed rockers having arms of unequal length pivotally mounted thereon in a concentric row one behind another so as to rock towards and away from the axis of rotation of the rotor, the longer arm of each of which rockers can bear on the shorter arm of an adjacent rocker, limiting means for restricting the movement of the rockers towards said axis, and a plurality of digging tools whereof at least one is operatively connected with each of said rockers so as to be rocked thereby, which rockers are arranged so that each can bear on and rock an adjacent rocker in a direction to remove a tool allotted thereto from the ground.

10. A digging device comprising in combination a rotor to be traversed over the ground, a plurality of two-armed rockers having arms of unequal length pivotally mounted thereon in a concentric row one behind another so as to rock towards and away from the axis of rotation of the rotor, limiting means for restricting the movement of the rockers towards said axis, and a plurality of digging tools whereof at least one is operatively connected with each of said rockers so as to be rocked thereby, which rockers are arranged so that the longer arm of each of said rockers can bear on and rock the shorter arm of an adjacent rocker in a direction to remove a tool allotted thereto from the ground.

11. A digging device comprising in combination a rotor to be traversed over the ground, a plurality of two-armed rockers having arms of unequal length pivotally mounted thereon in a concentric row one behind another so as to rock towards and away from the axis of rotation of the rotor, an annular abutment with which the rockers can coact to limit their movement away from said axis, and a plurality of digging tools whereof at least one is operatively connected with each of said rockers so as to be rocked thereby, which rockers are arranged so that each can bear on and rock an adjacent rocker in a direction to remove a tool allotted thereto from the ground.

12. A digging device comprising in combination a rotor to be traversed over the ground, two sets of rockers pivotally mounted thereon in two eccentric rows so that each rocker can rock towards and away from the axis of rotation of the rotor, which rows of rockers are arranged spaced apart in the direction of length of said axis, and the pivotal axes of the rockers of one set are arranged alternately with those of the other set, means for restricting the movement of the rockers toward said axis, and two sets of tool-carrying rods each operatively connected with one of said rockers so as to be rocked thereby, which rockers are arranged so that each in one set can bear on and rock an adjacent rocker in the same set in a direction to remove the tool or tools on a said rod allotted thereto from the ground.

13. A digging device comprising in combination a rotor to be traversed over the ground, two sets of rockers pivotally mounted thereon in two concentric rows so that each rocker can rock towards and away from the axis of rotation of the rotor, which rows of rockers are arranged spaced apart in the direction of length of said axis, and the pivotal axes of the rockers of one set are arranged alternately with those of the other set, means for restricting the movement of the rockers towards said axis, and two sets of tool-carrying rods each operatively connected with one of said rockers so as to be rocked thereby, which rockers are arranged so that each in one set can bear on and rock an adjacent rocker in the same set in a direction to remove the tool or tools on a said rod allotted thereto from the ground, each of which rods carries a plurality of tools, and the tools on one rod in one set are staggered in relation to the tools on an adjacent rod in the other set.

WILLIAM HENRY HONY FROST.